United States Patent
Zhao et al.

(10) Patent No.: US 8,704,872 B2
(45) Date of Patent: Apr. 22, 2014

(54) METHOD AND DEVICE FOR SWITCHING VIDEO PICTURES

(75) Inventors: Yunxuan Zhao, Shenzhen (CN); Xiangbin Yan, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 121 days.

(21) Appl. No.: 13/552,444

(22) Filed: Jul. 18, 2012

(65) Prior Publication Data

US 2012/0287230 A1     Nov. 15, 2012

Related U.S. Application Data

(63) Continuation of application No. PCT/CN2010/076770, filed on Sep. 9, 2010.

(30) Foreign Application Priority Data

Jan. 18, 2010    (CN) .......................... 2010 1 0002289

(51) Int. Cl.
     *H04N 7/15*           (2006.01)

(52) U.S. Cl.
     CPC ..................................... *H04N 7/15* (2013.01)
     USPC ................... 348/14.09; 348/14.08; 348/14.11

(58) Field of Classification Search
     USPC ................... 348/14.01–14.16; 370/260–261; 709/204; 715/754
     See application file for complete search history.

(56) References Cited

U.S. PATENT DOCUMENTS

| | | |
|---|---|---|
| 2008/0084831 A1 | 4/2008 | Sylvain |
| 2008/0218584 A1 | 9/2008 | Matsumoto et al. |
| 2009/0009587 A1 | 1/2009 | Lindbergh |
| 2009/0207232 A1* | 8/2009 | Mizuno et al. ............. 348/14.09 |
| 2010/0013905 A1* | 1/2010 | Kumar et al. .............. 348/14.09 |
| 2011/0249085 A1* | 10/2011 | Zhan et al. ................ 348/14.08 |

FOREIGN PATENT DOCUMENTS

| | | |
|---|---|---|
| CN | 1934861 A | 3/2007 |
| CN | 101442654 A | 5/2009 |
| GB | 2318021 A | 4/1998 |

OTHER PUBLICATIONS

Office Action issued in corresponding Chinese Patent Application No. 201010002289.2, mailed Oct. 15, 2012.

International Search Report and Written Opinion of the International Searching Authority issued in corresponding PCT Patent Application No. PCT/CN2010/076770, mailed Dec. 16, 2010.

(Continued)

*Primary Examiner* — Melur Ramakrishnaiah
(74) *Attorney, Agent, or Firm* — Brinks Gilson & Lione (57) ABSTRACT

A method and device for switching video pictures are disclosed in the invention, which belong to video conference field. Said method includes: obtaining correspondence relations between participants and venues; finding, when a participant is called, a venue corresponding to the called participant according to the correspondence relations; and switching the video pictures to the venue corresponding to the called participant. According to the invention, it is possible to find the venue corresponding to the called participant according to the correspondence relations, and automatically switch the video to the venue or request to an MCU for switching the video to the venue, without a manual intervention of the participant or waiting for a response from the participant, so that continuity of the video conference is ensured, the video pictures can be switched in time, and "face to face" communion experience of the participants in the video conference is improved.

6 Claims, 5 Drawing Sheets

(56) References Cited

OTHER PUBLICATIONS

Office Action issued in corresponding Australian Patent Application No. 2010342701, mailed Aug. 23, 2013, 4 pages.

Extended European Search Report issued in corresponding European Patent Application No. 10842877.2, mailed Jun. 20, 2013, 6 pages.

* cited by examiner

METHOD AND DEVICE FOR SWITCHING VIDEO PICTURES

CROSS-REFERENCE TO RELATED APPLICATIONS

This application is a continuation of International Application No. PCT/CN2010/076770, filed on Sep. 9, 2010, which claims priority to Chinese Patent Application No. 201010002289.2, filed on Jan. 18, 2010, both of which are hereby incorporated by reference in their entireties.

FIELD OF THE INVENTION

The present invention relates to the field of video conference, and particularly, to a method and a device for switching video pictures.

BACKGROUND OF THE INVENTION

Video technology realizes a remote transmission that integrates information such as voice, images and data, so that peoples who are remotely communicating with each other using the video technology can not only hear voice of the other party, but also see moving images and film contents thereof, thus the communication becomes far more cordial and telepresent.

A video conference system consists of a Multipoint Control Unit (MCU) and terminals. Each terminal corresponds to a venue, collects and encodes sounds and images of the venue, and transmits the sounds and images to the MCU. The MCU processes the sounds and images in a certain manner, such as sound mixing, image forwarding or multi-picture formation, and transmits the processed sounds and images to respective terminals. The terminals decode and output the sounds and images from the far-end venues, thereby realizing a remote communication.

There are mainly two methods for switching video pictures in a cur rent video conference.

The first method is one of requesting via a remote controller. When a participant in Venue 1 wants to watch a picture of Venue 2, he/she shall send conference control information through the remote controller, and request to the MCU for watching a picture of Venue 2. Upon receiving the control information "Venue 1 request watching a picture of Venue 2" sent from the terminal of Venue 1, the MCU forwards the video stream of Venue 2 to Venue 1. As a result, Venue 1 performs the picture switching function one time.

The second method is a voice exciting image (also referred to as voice activated switch) method, which determines a venue at which the current speaker is located by comparing the volumes of the voices at respective venues in the conference, and automatically broadcasts the picture of the venue to other venues for watching.

During the implementation of the present invention, the inventors find that the existing technology at least has the following problem:

The method of requesting via a remote controller frequently switches pictures through the remote controller, which affects continuity and interactivity of the conference. The method of voice activated switch broadcasts a picture of a venue to other venues for watching only when a speech is made in the venue, thereby causing a certain hysteresis.

SUMMARY OF THE INVENTION

In order to ensure continuity of a video conference and switch video pictures in time, the embodiments of the present invention provide a method and a device for switching video pictures.

The technical solutions are given as follows.

A method for switching video pictures includes:
obtaining correspondence relations between participants and venues;
finding, when a participant is called, a venue corresponding to the called participant according to the correspondence relations; and
switching the video pictures to the venue corresponding to the called participant.

A device for switching video pictures includes:
a relation obtaining module configured to obtain correspondence relations between participants and venues;
a venue finding module configured to find, when a participant is called, a venue corresponding to the called participant according to the correspondence relations obtained by the relation obtaining module; and
a video switching module configured to switch the video pictures to the venue corresponding to the called participant found by the venue finding module.

A device for switching video pictures includes:
a relation obtaining module configured to obtain correspondence relations between participants and venues;
a venue finding module configured to find, when a participant is called, a venue corresponding to the called participant according to the correspondence relations obtained by the relation obtaining module; and
a switch requesting module configured to send to a Multipoint Control Unit (MCU) a video switching request, which includes an identification of the venue corresponding to the called participant, so that the MCU switches the video pictures to the venue corresponding to the called participant.

The technical solutions of the embodiments of the present invention achieve the following beneficial effect:

When a participant is called, it is possible to find a venue corresponding to the called participant by obtaining the correspondence relations between the participants and the venues and automatically switch the video to the venue or request to the MCU for switching the video to the venue, without a manual intervention of the participant or waiting for a response from the participant, so that the continuity of the video conference is ensured, the video pictures can be switched in time, and "face to face" communion experience of the participants in the video conference is improved.

DETAILED DESCRIPTION OF THE EMBODIMENTS

In order to make the object, technical solutions and advantages of the present invention be clearer, the embodiments of the present invention will be further detailedly described as follows with reference to the drawings.

Embodiment 1

Figure 1:
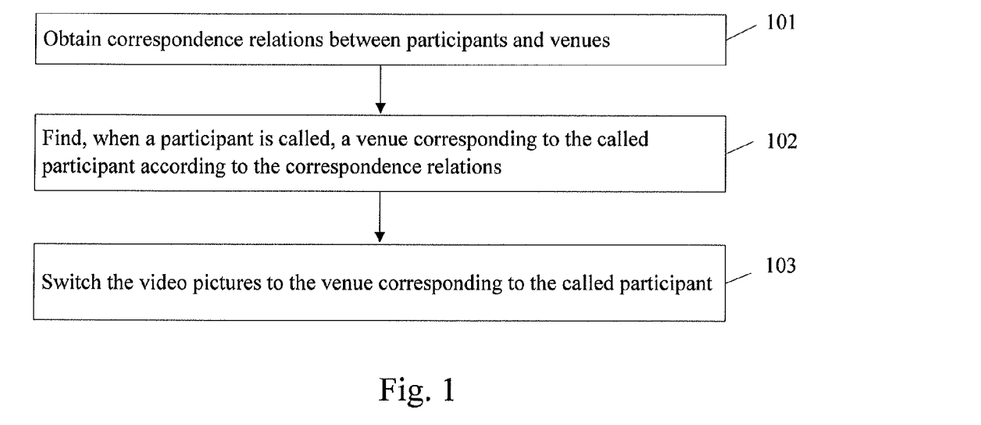
FIG. 1 is a flowchart of a method for switching video pictures according to Embodiment 1 of the present invention.

A method for switching video pictures according to this embodiment is described hereinafter with reference to FIG. 1.

In step 101, correspondence relations between participants and venues are obtained.

In step 102, when a participant is called, a venue corresponding to the called participant is found according to the correspondence relations.

In step 103, video pictures are switched to the venue corresponding to the called participant.

According to the method of the embodiment, when a participant is called, it is possible to find a venue corresponding to the called participant by obtaining correspondence relations between the participants and the venues and automatically switch the video to the venue or request to the MCU for switching the video to the venue, without a manual intervention of the participant or waiting for a response from the participant. Thus continuity of the video conference is ensured, and the video pictures can be switched in time, so that "face to face" communion experience of the participants in the video conference is improved.

Next, the method for switching video pictures is described by way of examples of obtaining correspondence relations by the MCU and a venue terminal, respectively.

Embodiment 2

Figure 2:
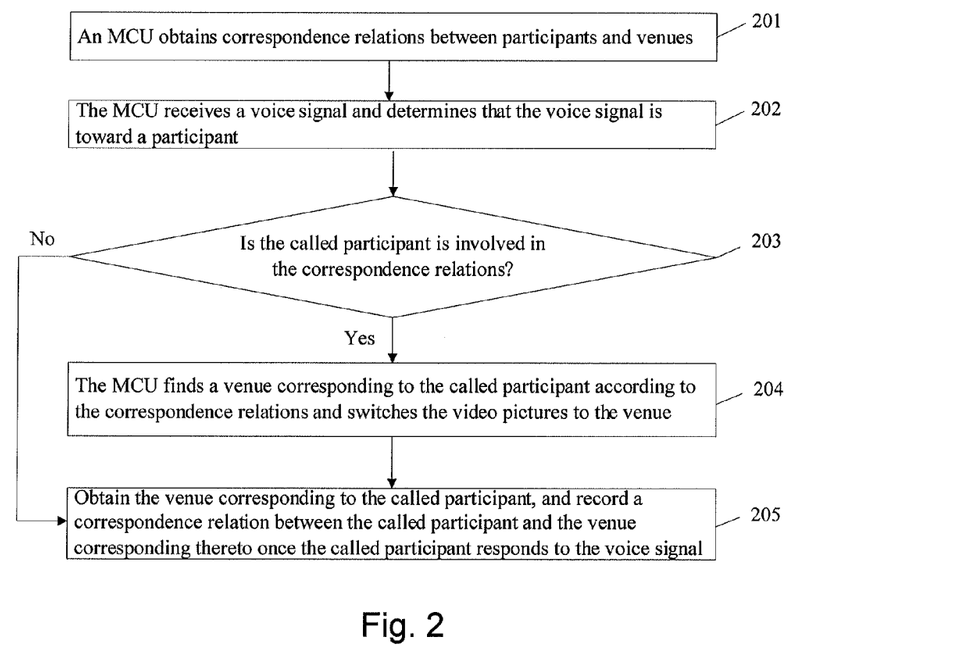
FIG. 2 is a flowchart of a method for switching video pictures according to Embodiment 2 of the present invention.

In this embodiment, a method for switching video pictures is described hereinafter by way of an example of obtaining correspondence relations by the MCU with reference to FIG. 2.

In step 201, the MCU obtains correspondence relations between participants and venues.

Herein, there may be two methods for the MCU to obtain the correspondence relations. One of the two methods is to preset the correspondence relations between the participants and the venues. Particularly, a table of correspondence relations between the participants and the venues is preset in the MCU, so that "Zhang San" is corresponding to Venue 1, "Li Si" is corresponding to Venue 2, and "Wang Wu" is corresponding to Venue N, for example. The other method is to obtain the correspondence relations between the participants and the venues through "study". The method for obtaining the correspondence relations through "study" is specifically described as follows.

Firstly, the method for obtaining the correspondence relations through "study" makes use of two habits of people freely communicating in a multipoint conference:

1. When a speaker calls a participant, his/her speech usually contains the participant's name, e.g., "Mr. Zhang San, how are you getting on with your work recently?", or "next, please listen to the speech of Mr. Li Si".

2. The called participant will speak in priority after the speaker stops his/her speech.

Figure 3:
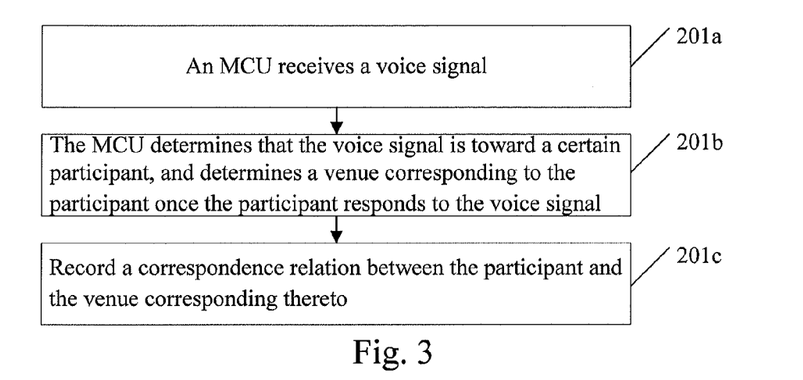
FIG. 3 is a flowchart of a method for an MCU to obtain correspondence relations through "study" according to Embodiment 2 of the present invention.

Based on the above consensus and with reference to FIG. 3, the method for obtaining the correspondence relations through "study" is described hereinafter.

In step 201*a*, the MCU receives a voice signal.

In step 201*b*, the MCU determines that the voice signal is toward a certain participant, and determines a venue corresponding to the participant after the participant responds to the voice signal.

Specifically, the MCU determines through a voice recognition technology that the voice signal is toward a certain participant, i.e., requires the called participant to respond to the voice signal.

Herein, the voice recognition process may include:

1) Recognizing whether the voice signal contains a name. For example, the Hundred Family Names and colloquial names (e.g., Lao Li) may be preset, and if the voice signal matches one of the preset Hundred Family Names or colloquial names, it means that the voice signal contains a name; otherwise the voice signal does not contain any name;

2) Presetting the grammar for calling the participant, including, but not limited to, the name appears at the beginning of the voice signal, or the word "please" occurs together with the name. For example, when the received voice signal is "next, please listen to the speech of Mr. Li Si", the MCU determines through the voice recognition technology that the voice signal contains the name "Li Si", which occurs together with the word "please", and determines that "Li Si" is called.

Particularly, after the participant responds to the voice signal, a venue corresponding to the participant is determined by detecting voice energy or voice activity. Herein, the venue may be identified with, but not limited to, venue name, location, port number, ID, etc.

Further, the MCU can determine that the voice signal is a normal speech, so that the video shall not be switched, and the current video shall still be forwarded to the venue terminals. For example, the voice signal such as "the theme of this conference is environment protection" or "this work is charged by Mr. Li Si" is a normal speech and the video shall not be switched. Herein, the normal speech may contain the participant's name, and the MCU determines through the voice recognition technology that the voice signal mentions the participant rather than is toward the participant.

Then, in step 201*c*, a correspondence relation between the participant and the venue corresponding thereto is recorded.

Figure 4:
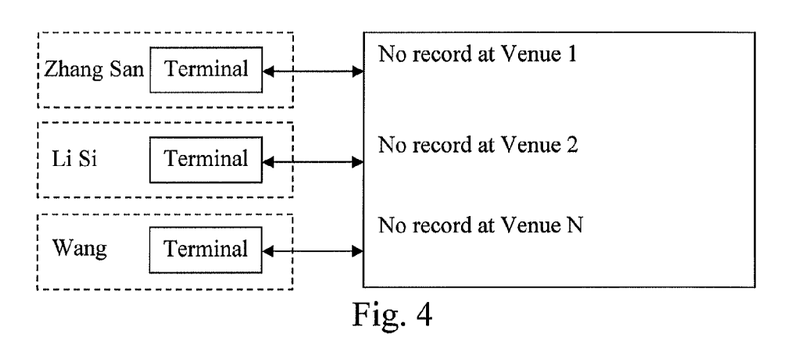
FIG. 4 is a schematic diagram of correspondence relations recorded by the MCU at the initial stage of a conference according to Embodiment 2 of the present invention.
Figure 5:
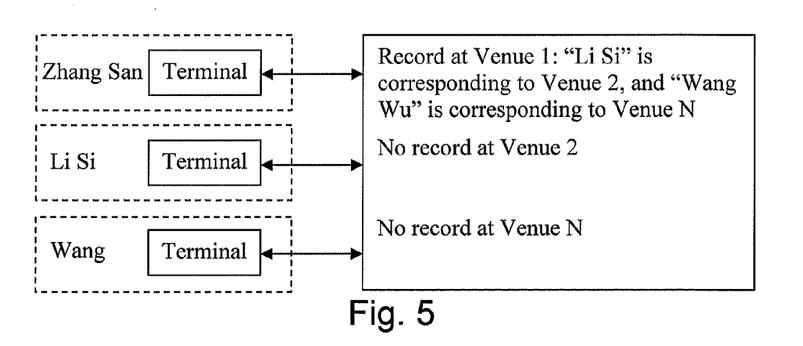
FIG. 5 is a schematic diagram of correspondence relations recorded by the MCU after "study" according to Embodiment 2 of the present invention.

For example, at the initial stage of a video conference, when there is no speech at any venue, correspondence relations recorded in the MCU are nulls, as illustrated in FIG. 4. Herein, Terminal 1 is a terminal of Venue 1, Terminal 2 is a terminal of Venue 2, and Terminal N is a terminal of Venue N. After "Zhang San" calls "Li Si" and "Wang Wu" at Venue 1, the MCU records that "Li Si" is corresponding to Venue 2, and "Wang Wu" is corresponding to Venue N, as illustrated in FIG. 5. Next, when "Li Si" or "Wang Wu" is called again by Venue 1, the MCU finds the venue corresponding to the name from the recorded correspondence relations, and sends the video picture of the venue to Venue 1 for watching. Since Venue 2 and Venue N do not voluntarily call any other venue, their records are still nulls.

The above two methods for obtaining correspondence relations need not to add any special control command in voice, and improve "face to face" communication experience. The above two methods also have other advantages, respectively. The first method of presetting is simple and easy to be implemented. The second method of "study" can automatically obtain the correspondence relations and update at any time.

Returning to FIG. 2, in step 202, the MCU receives the voice signal, and determines that the voice signal is toward a participant.

Particularly, the MCU determines through the voice recognition technology that the voice signal is toward a participant.

Furthermore, the MCU may determine that the voice signal is a normal speech, so that the video shall not be switched, and the current video shall still be forwarded to the venue terminals. It is already described specifically with respect to step 201b and thus omitted herein.

In step 203, it is determined whether the called participant is involved in the correspondence relations. If it is determined that the called participant is involved in the correspondence relations, the procedure goes to step 204; otherwise, the procedure goes to step 205.

In step 204, the MCU finds the venue corresponding to the called participant according to the correspondence relations and switches the video pictures to the venue.

In step 205, after the called participant responds to the voice signal, the venue corresponding to the called participant is obtained, and the correspondence relation between the called participant and the venue corresponding thereto is recorded.

Particularly, the process for obtaining the venue corresponding to the called participant includes, but not limited to, determining the venue corresponding to the called participant by detecting voice energy (also referred to as voice envelope) or voice activity.

Herein, the MCU concerned in the embodiment may be independent from the venues, or integrated with a terminal of a certain venue.

According to the method of this embodiment, when a participant is called, the MCU can find a venue corresponding to the called participant by obtaining the correspondence relations between the participants and the venues and automatically switch the video to the venue, without a manual intervention of the participant or waiting for a response from the participant, so that the continuity of the video conference is ensured, the video pictures can be switched in time, and the "face to face" communion experience of the participants in the video conference is improved. In addition, since the MCU obtains the correspondence relations and determines the venue to be switched to, the requirement on performance of the venue terminals is decreased, and it is convenient to collectively mange the correspondence relations.

Embodiment 3

Figure 6:
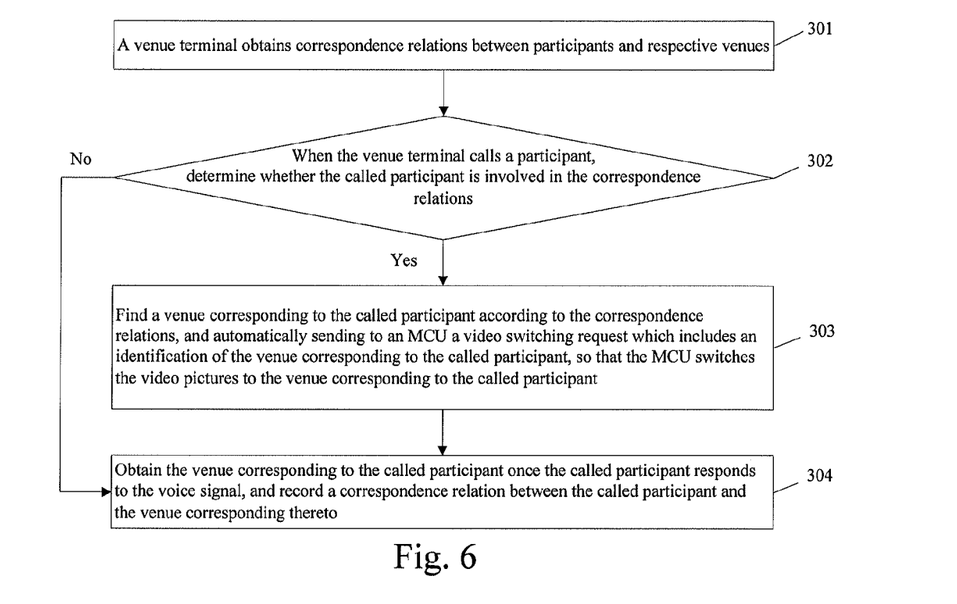
FIG. 6 is a flowchart of a method for switching video pictures according to Embodiment 3 of the present invention.

In this embodiment, a method for switching video pictures is described hereinafter by way of an example of obtaining correspondence relations by avenue terminal with reference to FIG. 6.

In step 301, a venue terminal obtains correspondence relations between participants and respective venues. Herein, the obtaining process includes but not limited to:

1) A method of presetting correspondence relations between participants and respective venues at respective venue terminals.

2) A method of distributing, by the MCU, the correspondence relations to respective venue terminals upon obtaining the correspondence relations. Herein, the method for the MCU to obtain the correspondence relations may use the method according to Embodiment 2.

3) A method of obtaining the correspondence relations through "study". This method is described hereinafter with reference to FIG. 7.

Figure 7:
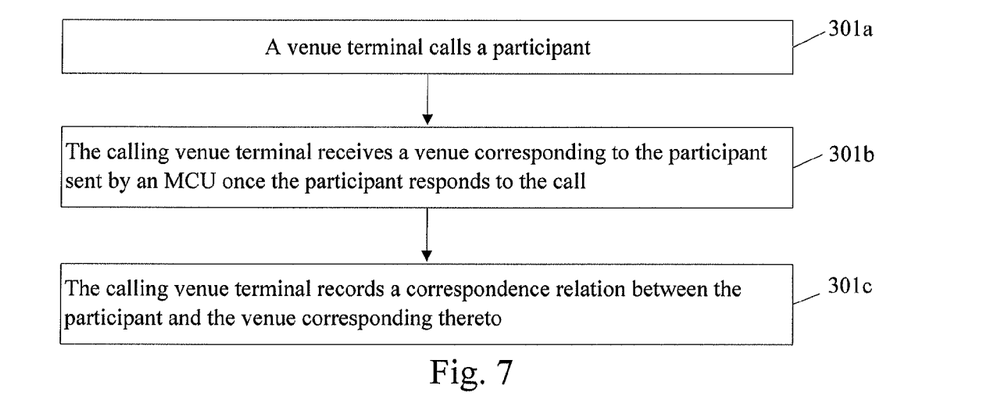
FIG. 7 is a flowchart of a method for a venue terminal to obtain correspondence relations through "study" according to Embodiment 3 of the present invention.

In step 301a, a venue terminal calls a participant.

In step 301b, once the participant responds to the call, the calling venue terminal receives a venue corresponding to the participant sent by the MCU.

Particularly, once the participant responds to the call through its venue terminal, the MCU determines and sends the venue corresponding to the participant. Herein, the method for determining the venue corresponding to the participant includes, but not limited to, determining the venue corresponding to the participant by detecting voice energy (also referred to as voice envelope) or voice activity. In addition, the venue corresponding to the participant may be identified with, but not limited to, venue name, location, port number, ID, etc.

Further, when the MCU is integrated with the calling venue terminal, the calling venue terminal obtains the venue corresponding to the participant once the participant responds to the call.

In step 301c, the calling venue terminal records the correspondence relation between the participant and the venue corresponding thereto.

The above three methods for obtaining correspondence relations need not to add any special control command in the voice, and improve "face to face" communication experience. The above three methods also have other advantages, respectively. The first method of presetting is simple and easy to be implemented. The second method of distributing by the MCU facilitates the centralized management and decreases the requirement on performance of the venue terminals. The third method of "study" can automatically obtain the correspondence relations and update at any time.

Returning to FIG. 6, in step 302, when the venue terminal calls a participant, it is determined whether the called participant is involved in the correspondence relations. If the determination result is yes, the procedure goes to step 303; otherwise, the procedure goes to step 304.

In step 303, the venue corresponding to the called participant is found according to the correspondence relations, and a video switching request is automatically sent to the MCU, which includes the identification of the venue corresponding to the called participant, so that the MCU switches the video pictures to the venue corresponding to the called participant.

In step 304, once the called participant responds to the call, the venue corresponding to the called participant is obtained, and the correspondence relation between the called participant and the venue corresponding thereto is recorded.

Herein, the method for obtaining the venue corresponding to the called participant includes: receiving the venue corresponding to the called participant sent by the MCU. The method for the MCU to obtain and send the venue corresponding to the participant has been described with reference to step 301b.

Herein, the MCU concerned in the embodiment may be independent from the venues, or integrated with the terminal of a certain venue.

According to the method of this embodiment, when a participant is called, the venue terminal can find a venue corresponding to the called participant by obtaining the correspondence relations between the participants and the venues, without a manual intervention of the participant or waiting for a response from the participant, and request to the MCU for switching the video to the venue, so that continuity of the video conference is ensured, the video pictures can be switched in time, and "face to face" communion experience of the participants in the video conference is improved.

Embodiment 4

Figure 8:
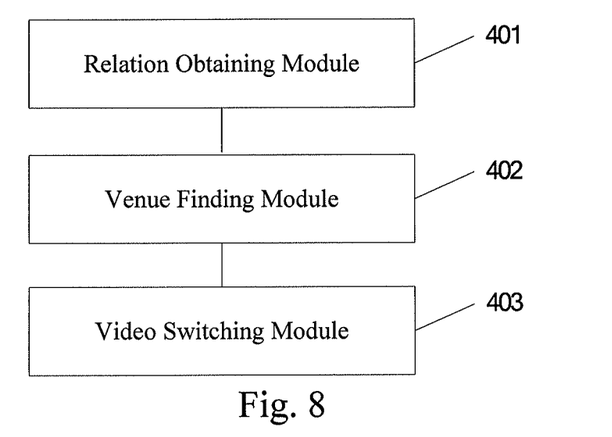
FIG. 8 is a configuration diagram of a device for switching video pictures according to Embodiment 4 of the present invention.

Referring to FIG. 8, this embodiment provides a device for switching video pictures, including:
- a relation obtaining module 401 configured to obtain correspondence relations between participants and venues;
- a venue finding module 402 configured to find, when a participant is called, a venue corresponding to the called participant according to the correspondence relations obtained by the relation obtaining module 401; and
- a video switching module 403 configured to switch the video pictures to the venue corresponding to the called participant found by the venue finding module 402.

Figure 9:
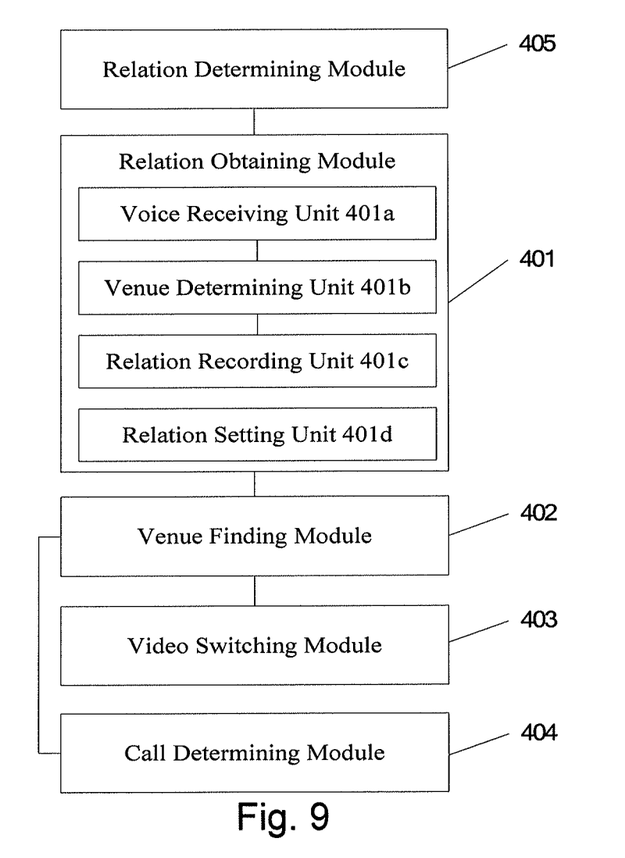
FIG. 9 is another configuration diagram of a device for switching video pictures according to Embodiment 4 of the present invention.

Referring to FIG. 9, the relation obtaining module 401 includes:
- a voice receiving unit 401a configured to receive a voice signal;
- a venue determining unit 401b configured to determine, through voice recognition technology, that the voice signal received by the voice receiving unit 401a is towards a participant, and determines a venue corresponding to the participant by detecting voice energy or voice activity upon receiving a response from the participant; and
- a relation recording unit 401c configured to record a correspondence relation between the participant and the venue corresponding thereto determined by the venue determining unit 401b.

Alternatively, the relation obtaining module 401 includes:
- a relation setting unit 401d configured to preset correspondence relations between participants and venues.

Further, the device may also include a call determining module 404 configured to receive a voice signal, and determine through voice recognition technology that the voice signal is towards a participant, and then performs the venue finding module 402.

Further, the device may also include a relation determining module 405 configured to determine whether the called participant is involved in the correspondence relations obtained by the relation obtaining module 401, and if not, obtain the venue corresponding to the called participant once the called participant responds to the call, and record the correspondence relation between the called participant and the venue corresponding thereto.

Particularly, the device of this embodiment may be the MCU.

According to the device of this embodiment, when a participant is called, it is possible to find a venue corresponding to the called participant by obtaining the correspondence relations between the participants and the venues, without a manual intervention of the participant or waiting for a response from the participant, and automatically switch the video to the venue, so that continuity of the video conference is ensured, the video pictures can be switched in time, and "face to face" communion experience of the participants in the video conference is improved. In addition, since the device obtains the correspondence relations and determines the venue to be switched to, the requirement on performance of the venue terminals is decreased, and it is convenient to collectively mange the correspondence relations.

Embodiment 5

Figure 10:
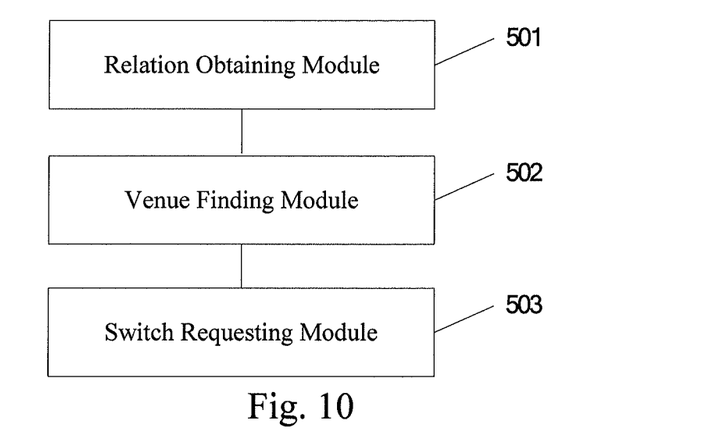
FIG. 10 is a configuration diagram of a device for switching video pictures according to Embodiment 5 of the present invention.

Referring to FIG. 10, this embodiment provides a device for switching video pictures, including:
- a relation obtaining module 501 configured to obtain correspondence relations between participants and venues;
- a venue finding module 502 configured to find, when a participant is called, a venue corresponding to the called participant according to the correspondence relations obtained by the relation obtaining module 501; and
- a switch requesting module 503 configured to send to an MCU a video switching request, which includes an identification of the venue corresponding to the called participant, so that the MCU switches the video pictures to the venue corresponding to the called participant.

Figure 11:
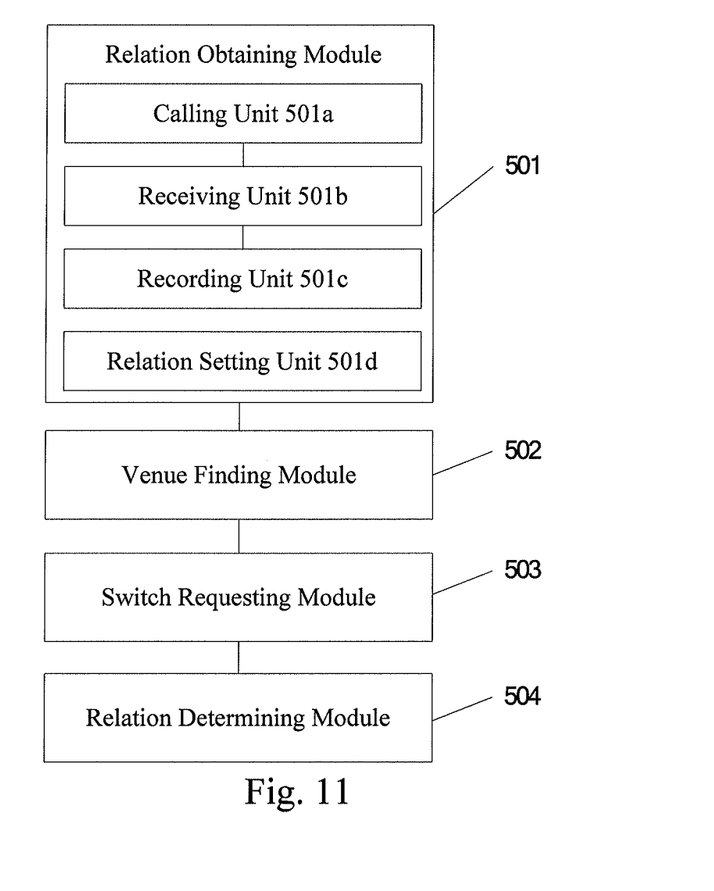
FIG. 11 is another configuration diagram of a device for switching video pictures according to Embodiment 5 of the present invention.

Referring to FIG. 11, the relation obtaining module 501 includes:
- a calling unit 501a configured to call a participant;
- a receiving unit 501b configured to receive a venue corresponding to the participant sent by the MCU once the participant responds to the call, or obtain a venue corresponding to the participant once the participant responds to the call; and
- a recording unit 501c configured to record a correspondence relation between the participant called by the calling unit 501a and the venue corresponding to the participant received by the receiving unit 501b.

Alternatively, the relation obtaining module 501 includes:
- a relation setting unit 501d configured to preset the correspondence relations between the participants and the venues.

Further, the device may also include:
- a relation determining module 504 configured to determine whether the called participant is involved in the correspondence relations obtained by the relation obtaining module 501, and if not, receive the venue corresponding to the called participant sent by the MCU once the called participant responds to the call, and record the correspondence relation between the called participant and the venue corresponding thereto.

Particularly, the device of this embodiment may be a venue terminal.

According to the device of this embodiment, when a participant is called, it is possible to find a venue corresponding to the called participant by obtaining the correspondence relations between the participants and the venues, without a manual intervention of the participant or waiting for a response from the participant, and request to the MCU for switching the video to the venue, so that continuity of the video conference is ensured, the video pictures can be switched in time, and "face to face" communion experience of the participants in the video conference is improved.

All or parts of the technical solutions according to the above embodiments can be implemented through software programming, and the software program is stored in a readable storage medium such as a hard disk, an optical disk or a floppy disk in computer.

The above descriptions are just preferred embodiments of the present invention, rather than limitations thereto. Any modification, equivalent replacement, improvement, etc. made under the spirit and principle of the present invention shall fall within the protection scope of the present invention.

What is claimed is:

1. A method for switching video pictures, comprising:
   obtaining correspondence relations between participants and venues;
   finding, when a participant is called, a venue corresponding to the called participant according to the correspondence relations; and
   switching the video pictures to the venue corresponding to the called participant;
   wherein obtaining the correspondence relations between the participants and the venues comprises:

receiving, by a Multipoint Control Unit (MCU), a voice signal;

determining, by the MCU, that the voice signal is towards the participant, and determining the venue corresponding to the participant upon receiving a response from the participant; and recording, by the MCU, a correspondence relation between the participant and the venue corresponding thereto.

2. The method according to claim 1, wherein determining, by the MCU, that the voice signal is towards the participant, and determining the venue corresponding to the participant upon receiving the response from the participant comprises:

determining, by the MCU, through voice recognition technology that the voice signal is toward the participant, and determining the venue corresponding to the participant by detecting voice energy or voice activity, upon receiving the response from the participant.

3. The method according to claim 1, wherein before finding, when the participant is called, the venue corresponding to the called participant according to the correspondence relations, the method comprises:

receiving, by the MCU, a voice signal; and determining, by the MCU, through voice recognition technology that the voice signal is towards the participant.

4. A device for switching video pictures, comprising:

a relation obtaining module configured to obtain correspondence relations between participants and venues;

a venue finding module configured to find, when a participant is called, a venue corresponding to the called participant according to the correspondence relations obtained by the relation obtaining module; and a video switching module configured to switch the video pictures to the venue corresponding to the called participant found by the venue finding module;

wherein the relation obtaining module comprises:

a voice receiving unit configured to receive a voice signal;

a venue determining unit configured to determine through voice recognition technology that the voice signal received by the voice receiving unit is towards the participant, and determines the venue corresponding to the participant by detecting voice energy or voice activity upon receiving a response from the participant; and a relation recording unit configured to record a correspondence relation between the participant and the venue corresponding thereto determined by the venue determining unit.

5. The device according to claim 4, further comprising a call determining module configured to receive a voice signal, and determine through voice recognition technology that the voice signal is towards the participant, and then initiates the venue finding module.

6. A device for switching video pictures, comprising:

a relation obtaining module configured to obtain correspondence relations between participants and venues;

a venue finding module configured to find, when a participant is called, a venue corresponding to the called participant according to the correspondence relations obtained by the relation obtaining module; and a switch request module configured to send to a Multipoint Control Unit (MCU) a video switching request, which comprises an identification of the venue corresponding to the called participant, so that the MCU switches the video pictures to the venue corresponding to the called participant;

wherein the device further comprising:

a relation determining module configured to determine whether the called participant is involved in the correspondence relations obtained by the relation obtaining module, and if the called participant is not involved in the correspondence relations obtained by the relation obtaining module, receive the venue corresponding to the called participant sent by the MCU once the called participant responds to the call, and record a correspondence relation between the called participant and the venue corresponding thereto.

\* \* \* \* \*